July 24, 1928.

W. W. WATKINS

COTTON CHOPPING MACHINE

Filed Feb. 15, 1928

INVENTOR.
Walter W. Watkins,
BY
Geo. F. Kimmel
ATTORNEY.

July 24, 1928.
W. W. WATKINS
1,678,542
COTTON CHOPPING MACHINE
Filed Feb. 15, 1928
3 Sheets-Sheet 2
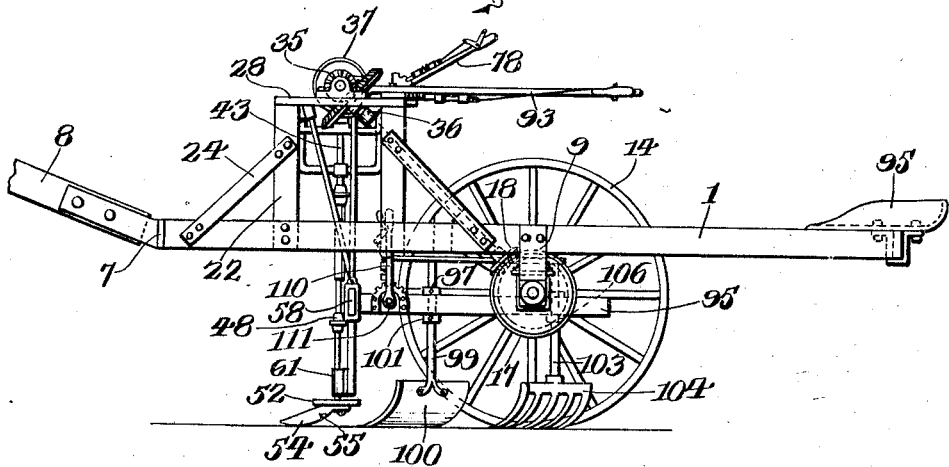
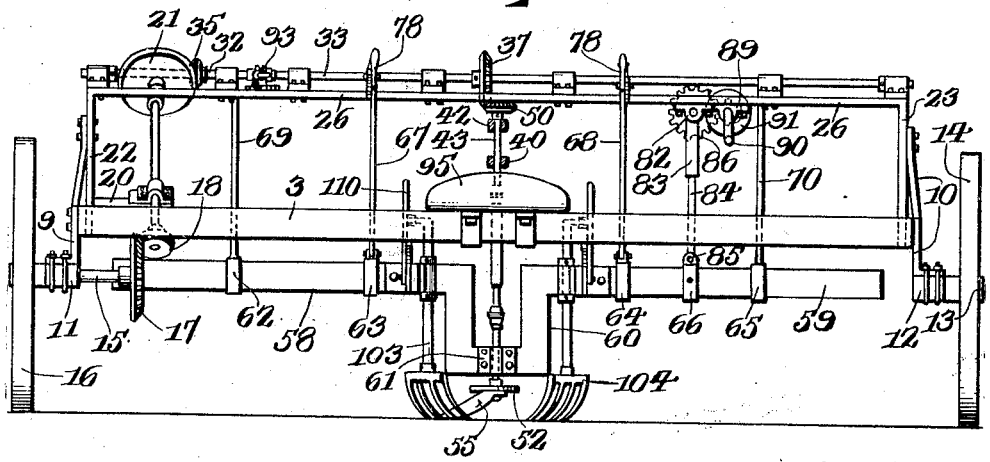
INVENTOR.
Walter W. Watkins,
BY
Geo. P. Kimmel
ATTORNEY.

July 24, 1928.  1,678,542
W. W. WATKINS
COTTON CHOPPING MACHINE
Filed Feb. 15, 1928   3 Sheets-Sheet 3
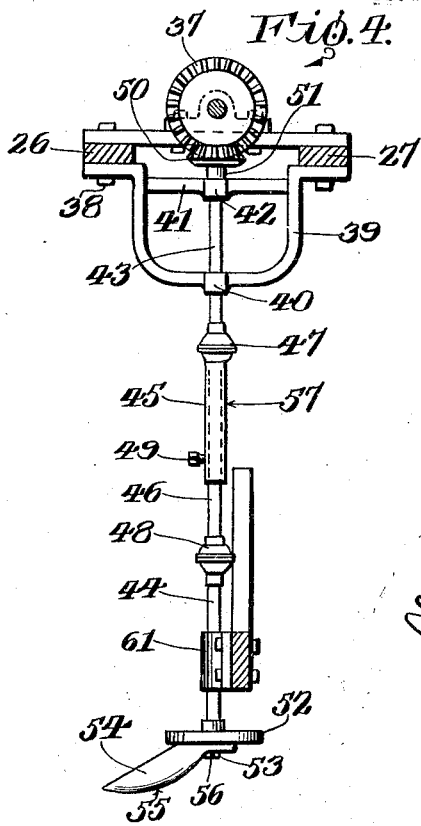
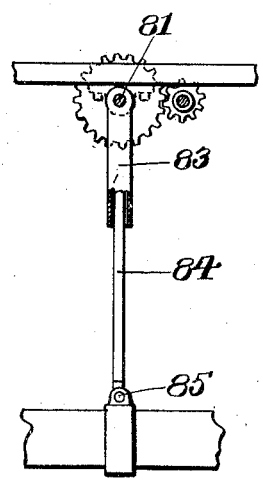
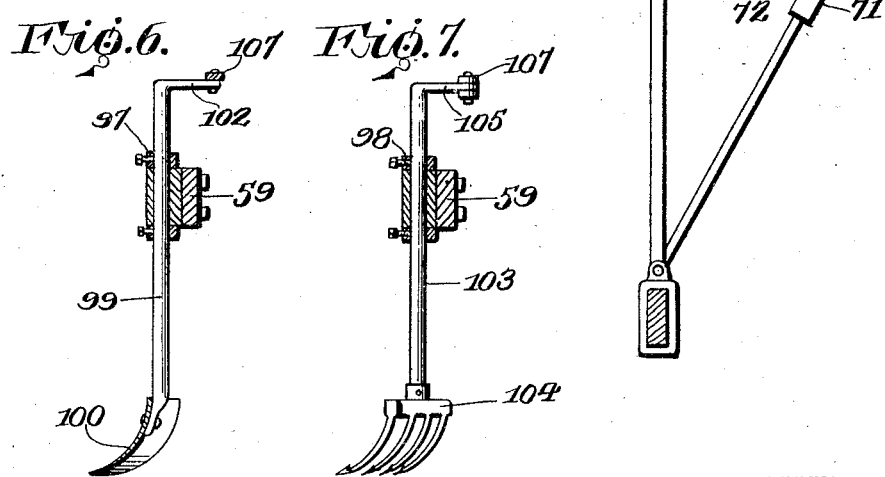
INVENTOR.
Walter W. Watkins,
BY
Geo. F. Kimmel
ATTORNEY.

Patented July 24, 1928.

1,678,542

UNITED STATES PATENT OFFICE.

WALTER WALLACE WATKINS, OF MOULTON, ALABAMA.

COTTON-CHOPPING MACHINE.

Application filed February 15, 1928. Serial No. 254,452.

This invention relates to a cotton chopping machine, and has for its object to provide, in a manner as hereinafter set forth, a machine of such class for expeditiously and efficiently chopping cotton plants and further whereby the chopper element of the machine is flexibly supported for the purpose of following crooked rows of plants.

A further object of the invention is to provide, a cotton chopper, in a manner as hereinafter set forth with a concavo-convex chopper element to prevent the soil picked up thereby from blocking the plant.

A further object of the invention is to provide, a cotton chopping machine, in a manner as hereinafter set forth with a chopper element constructed and driven in a manner to provide spaced intervals between the chopping strokes.

A further object of the invention is to provide, a cotton chopping machine, in a manner as hereinafter set forth, means acting after the chopping of the plants to cultivate the soil in a thoroughly satisfactory manner and with less labor than the means now generally employed, and further whereby the work performed thereby will equal that obtained by a pair of cultivators.

Further objects of the invention are to provide, in a manner as hereinafter set forth, a cotton chopping machine which is comparatively simple in its construction and arrangement, strong, durable, conveniently adjusted, thoroughly efficient in its use, readily assembled, and comparatively inexpensive to set up.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 2 is a side elevation thereof.

Figure 3 is a rear elevation.

Figure 4 is an elevation of the chopping element and the drive shaft therefor.

Figure 5 is a fragmentary view illustrating the means for bodily shifting horizontally the carrier bar.

Figure 6 is a detail partly in elevation and section illustrating one of the scraper elements.

Figure 7 is a view similar to Figure 6 illustrating one of the scratcher members.

Figure 8 is a fragmentary view in section illustrating one of the lifting devices for the carrier bar.

Figure 1:
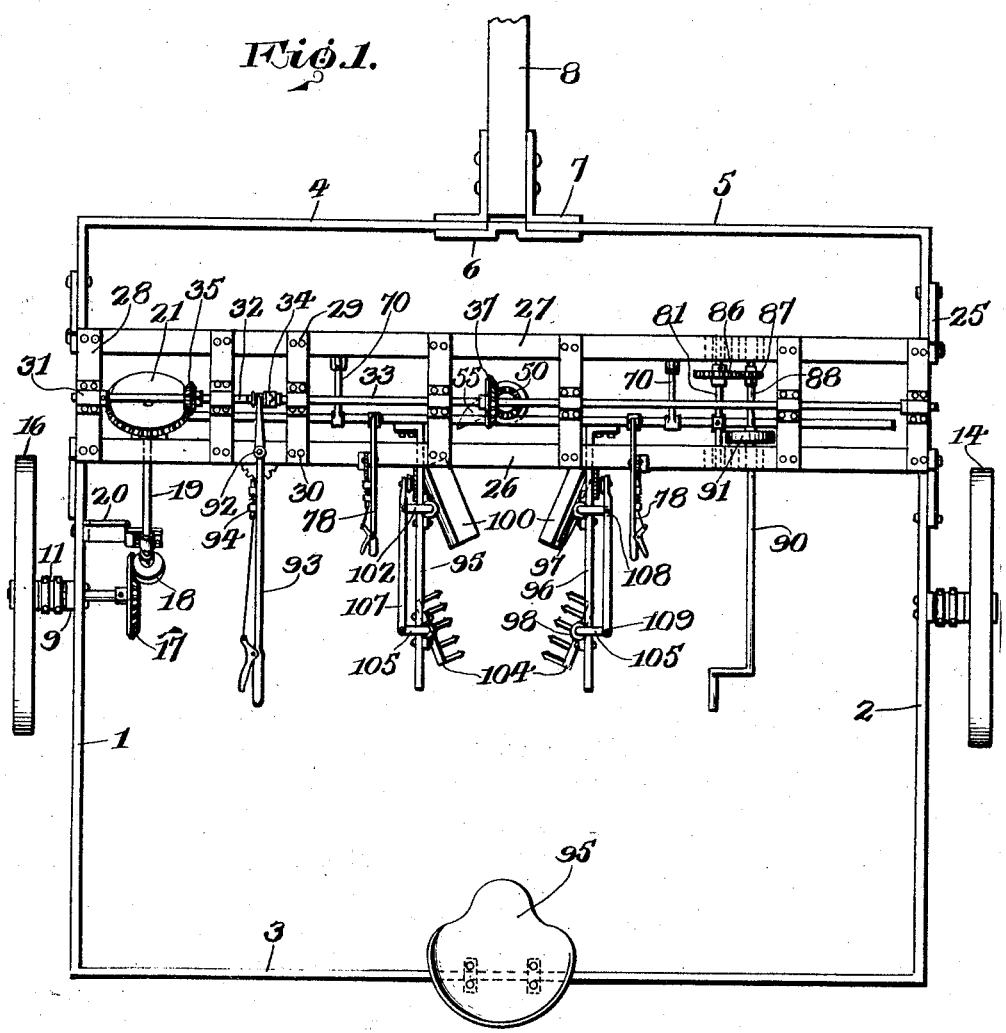
Figure 1 is a top plan view of a cotton chopping machine in accordance with this invention.

The machine includes a body portion in the form of a rectangular frame comprising side bars or members 1, 2, a rear bar or member 3 and a sectional front bar or member. The sections of the front bar or member are indicated at 4, 5 and have their inner ends arranged in spaced relation. The section 4 is integral with the forward end of the bar 1 and the section 5 is integral with the forward end of the bar 2. The sections 4 and 5 extend at right angles with respect to the bars 1, 2 respectively and are connected together by a coupling member 6. Secured to the sections 4, 5 of the front bar are coupling brackets 7 to which is attached a tongue 8 for connection to a suitable traction means for the machine. Secured to and depending from the side bar 1, as well as the side bar 2, is an axle hanger. The hangers are indicated at 9, 10 and each of which has fixedly secured thereto a bearing. The bearing secured to the hanger 9 is indicated at 11 and that secured to the hanger 10 at 12. An axle 13 is mounted in the bearing 12 and carries a wheel 14. An axle 15 is extended through the bearing 11 and carries on its outer end a wheel 16. The inner end of the axle 15 is provided with a beveled gear 17, which meshes with a beveled pinion 18 carried on the lower end of an upstanding, forwardly inclined transmission shaft 19. A bracket 20 is secured to the frame bar 1, extends inwardly therefrom and supports the shaft 19 at the lower portion thereof. Carried on the upper end of the shaft 19 is a beveled gear 21 which is disposed at right angles with respect to the gear 17. The purpose of the gear 17, pinion 18, shaft 19 and gear 21 will be presently referred to.

Carried by the body portion between its transverse median and its front end is a superstructure, in the form of a frame and comprising two pairs of spaced uprights. The uprights of one pair are indicated at 22 and the uprights of the other pair at 23. The lower ends of the uprights 22 are fixedly secured to the side bar 1 of the body portion and the lower ends of the uprights 23 are fixedly secured to the side bar 2 of the body portion. Oppositely disposed inclined brace members 24 are provided for the uprights 22 and said brace members are fixedly secured to said uprights 22 and also to the side bar 1 of the body portion of the machine. Oppositely disposed inclined brace members 25 are provided for the uprights 23 and said brace members 25 are secured to said uprights and to the side bar 2 of the body portion of the machine. The rear upright 22 is connected to the rear upright 23 by a flat supporting member 26 and preferably the said member 26 is integral with the rear uprights 22, 23. Connected to the front uprights 22 and 23 is a flat supporting member 27. Preferably the member 27 is integral with the upper ends of the front uprights 22 and 23. Secured upon the supporting members 26, 27 are spaced, flat strips 28 having their forward ends secured by the holdfast devices 29 to the support 27 and their rear ends secured by the holdfast devices 30 to the support 26. Each strip 28 centrally thereof is provided with a bearing 31. The bearings 31 are arranged in alignment. One of the strips 28 is positioned at one end of the supporting members 26, 27 and another of the strips 28 is positioned at the other ends of the supporting members 26, 27.

Mounted in the aligning bearings 31, of a length corresponding to the width of the body portion is an operating shaft formed of two sections 32, 33, having associated therewith a clutch 34. The section 32 is a driving section and the section 33 the driven section and the clutch 34 is employed for coupling the sections 32, 33 together whereby said sections will be synchronously operated. The section 32 is provided with a beveled pinion 35 which meshes with and is driven from the beveled gear 21. A bearing for the upper end of the shaft 19 is indicated at 36. See Figure 2. The section 33 is provided intermediate its ends with a beveled gear 37 for the purpose of driving the chopping element actuating shaft which will be presently referred to.

Secured to the supporting members 26, 27, by the holdfast devices 38 is a depending yoke 39, having its face provided with a bearing 40 and further having the upper portions of the arms thereof connected together by a cross bar 41, provided with a bearing 42 which is arranged in alignment with the bearing 40. The bearings 40, 42 are associated with the actuating shaft for the chopper element. The said actuating shaft comprises an upper section 43, a lower section 44 and a pair of intermediate sections 45, 46. The section 45 is tubular, open at its lower end and has its upper end connected with the lower end of the section 43 by a universal joint 47. The section 46 extends into the section 45 and has its lower end connected to the upper end of the section 44 by a universal joint 48. The forming of the actuating shaft, for the chopper element, of a series of sections connected together by the universal joint provides a flexible actuating shaft. The section 46 telescopes in the section 45 for the purpose of adjusting the length of said actuating shaft and after the section 46 has been adjusted to the desired position, it is maintained in adjusted position by a set screw 49 carried by the section 45. The section 43 extends through the bearings 42, 40 and the universal joint 47 is arranged below the bearing 40. The section 43 projects above the bearing 42 and is provided with a beveled pinion 50 which meshes with the beveled gear 37 whereby when the operating shaft is driven the actuating shaft will be operated. The pinion 50 is provided with a hub 51 which bears against the connecting bar or member 41 for the purpose of retaining the pinion 50 in mesh with the gear 37. The section 44 has secured to its lower end a disc 52 against the lower face of which abuts the shank 53 of the blade 54 of the chopper element referred to generally at 55. The blade 54 is of concavo-cross section and is disposed at an angle with respect to the section 44, as well as depends from the disc 52. The shank 53 and blade 54 are secured to the disc 52 by a holdfast means 56. The blade 54 projects a substantial distance beyond the edge of the disc 52. The actuating shaft for the chopper element is referred to generally as 57 and when driven from the operating shaft carries the cutter element 55 therewith, but owing to the manner in which the element 55 is constructed there is an interval of time between each cutting stroke thereof or in other words the activity of the element 55, from a cutting standpoint, is intermittent. The providing of the blade 54 of concave contour, in cross section, permits of its taking up the dirt so that the dirt will not block the plant.

Suspended below the body portion of the machine as well as being horizontally and vertically adjusted is a carrier bar consisting of a pair of outer portions 58, 59 and an intermediate portion 60 in the form of a crank part or yoke. The portion 58 is connected to the upper end of one of the arms of the intermediate portion 60 and extends outwardly at right angles with respect thereto and the portion 59 is connected to the upper end of the other arm of the intermediate portion 60 and extends outwardly at right angles with respect thereto. The bottom of the intermediate portion 60 has secured to one side face thereof a bracket 61 which provides a combined guide and bearing for the lower section 44 of the shaft 57. The bracket 61 is positioned above the disc 52. The portion 58 of the carrier bar is slidably mounted in a pair of collars 62, 63 of rectangular form. The portion 59 of the carrier bar is slidably mounted in a pair of collars 64, 65 of rectangular form. Fixed to the portion 59 of the carrier bar and arranged between the collars 64, 65 is a collar 66. Pivotally connected to the collars 63, 64, are the lower ends of a pair of lifting rods 67, 68 respectively. Fixed at their lower ends to the collars 62, 65 are brace rods 69, 70 respectively which are secured to sleeves 71, pivotally attached as at 72, to lugs 73, depending from the supporting member 27. See Figure 8. The rod 67, as well as the rod 68, has a pin and slot connection between its upper end and a crank arm. The pin and slot connection is indicated at 74 and the crank arm at 75. See Figure 8. The crank arm 75 is carried by a short shaft 76 mounted in a bearing 77 carried by the supporting member 26. Connected to the shaft 76 is a lever arm 78 carrying a spring controlled lever and ratchet mechanism 79 which associate with a toothed quadrant 80 for the purpose of retaining the lever 78 in shifted position. The toothed quadrant 80 is fixed to the supporting member 26. The levers 78 and the elements connected therewith, in connection with the rods 67, 68 provide vertically adjusting mechanisms for the carrier bar.

The carrier bar is shifted horizontally from a shaft 81 which is mounted in bearing brackets 82 secured to the lower faces of the members 26, 27. Fixed to and depending from the shaft 81 is a shifting member for the carrier bar and which consists of a tubular upper section 83 into which telescopes a lower section 84 pivoted as at 85 to the collar 66. Carried by the shaft 81 is a gear wheel 86 which meshes with a pinion 87 mounted on a shaft 88 positioned in bearing brackets 89 secured to the lower faces of the members 26, 27. The shaft 88 is extended rearwardly and provided with a crank 90 for the purpose of manually rotating the shaft. The shaft 88 carries a balance wheel 91. Pivotally connected to the member 26, as at 92 is a shifting member 93 for the clutch 34 and said member 93 has associated therewith a spring controlled lever, pawl and ratchet mechanism 94 for retaining the member 93 in set position. The member 93 extends rearwardly with respect to the member 26 and the lever members 78 also extend rearwardly with respect to the member 26. The body portion or frame of the machine is provided at its rear with an operator's seat 95.

Secured to and projecting rearwardly from the carrier bar and arranged at each side of the intermediate portion 60 of such bar are supporting arms 95, 96 and each of which has secured to its inner face a pair of spaced, vertically disposed, combined guide and bearing brackets 97, 98, one arranged in advance of the other. Extending down through each bracket 97 is a vertically disposed shank or standard 99 having fixed to its upper end a curved scraper 100. The shank 99 is provided with stop collars 101 engaging with an arm 95 or 96 to arrest vertical movement of the shank. The upper end of the shank 99 is formed with an outwardly directed crank arm 102. Extending down through each bracket 98 is a vertically disposed shank or standard 103 having secured to its lower end a scratcher member 104. The upper end of the shank 103 has an outwardly directed crank arm 105. The shank 103 carries a pair of stop collars 106 for arresting vertical movement of said shank 103. Each crank arm 102 is connected to a crank arm 105 by a shifting bar 107. The crank arm 102 is connected to the bar 107 as at 108 and the crank arm 105 is pivotally connected to the bar 107 as at 109. Each bar 107 is pivotally connected at its forward end to a shifting mechanism 110 consisting of a lever and a spring controlled lever, dog and ratchet means. The lever of the shifting mechanism 110 is pivotally connected to a supporting arm 95 or 96 as at 111. The shifting mechanisms 110, in connection with the bars 107, provide for angularly adjusting the scrapers and the scratchers. The scraper members 100 are in the form of shovels or blades and the scratcher members 104 in the form of rakes. The scraper members are arranged forwardly of the scratcher members and the chopping element is arranged forwardly of the scraper members. The scraper and scratcher members provide means for cultivating the ground after the plants have been chopped down by the blade 54.

As the actuating shaft for the chopping element is flexible, it will give on the horizontal adjustment of the carrier bar. As the shifting member for the carrier bar is telescopic, formed of the sections 83, 84 it does not interfere with the vertical adjustment of the carrier bar when desired. As the actuating shaft for the chopper element is formed of telescopic sections it does not interfere with the vertical adjustment of the carrier bar. As the carrier bar is horizontally shiftable the chopper element can be arranged at the desired point when the plants are set up in irregular rows. When the carrier bar is horizontally shiftable the chopping element, scraper and scratching members are bodily carried therewith. The crank 90 for the rotating shaft 88 is arranged in convenient reach of the operator, as well as the lever member 93 which is employed for moving the clutch 34 into and out of clutching position with respect to the shaft section 32 relative to the shaft section 33.

It is thought the many advantages of a cotton chopping machine, in accordance with this invention can be readily understood, and although the preferred embodiment of the invention is as illustrated and described, yet it is to be understood that changes in the details of construction can be had which fall within the scope of the invention as claimed.

What I claim is:

1. A machine for the purpose set forth a mobile supporting structure, a vertically and horizontally adjustable carrier bar supported therefrom, plant chopping and ground working elements connected to said bar and bodily shiftable therewith, means independent of said bar for vertically adjusting said chopping element, and means for angularly adjusting said ground working element.

2. In a machine for the purpose set forth a mobile supporting structure, a vertically disposed actuating shaft driven from said structure, a radially disposed cutter at the lower end of the shaft, ground working devices arranged one in advance of the other and positioned rearwardly of said cutter, means for vertically adjusting the cutter and means for angularly adjusting the ground working devices.

3. In a machine for the purpose set forth a mobile supporting structure, a carrier bar, vertically adjusting means for said bar, said means suspending said bar from said structure and slidably supporting the bar, means carried by said structure and connected with the bar for adjusting it horizontally, a vertically adjustable, flexible cutter element operating shaft connected to the bar and driven from said structure, and a cutter on the lower end of said shaft.

4. In a machine for the purpose set forth a mobile supporting structure, a carrier bar, vertically adjusting means for said bar, said means suspending said bar from said structure and slidably supporting the bar, means carried by said structure and connected with the bar for adjusting it horizontally, a vertically adjustable, flexible cutter element operating shaft connected to the bar and driven from said structure, a cutter on the lower end of said shaft, and ground working devices connected to said bar and arranged rearwardly of said cutter.

5. In a machine for the purpose set forth a mobile supporting structure, a carrier bar, vertically adjusting means for said bar, said means suspending said bar from said structure and slidably supporting the bar, means carried by said structure and connected with the bar for adjusting it horizontally, a vertically adjustable, flexible cutter element operating shaft connected to the bar and driven from said structure, a cutter on the lower end of said shaft, ground working devices connected to said bar and arranged rearwardly of said cutter, and means carried by said bar for angularly adjusting said devices.

In testimony whereof, I affix my signature hereto.

WALTER WALLACE WATKINS.